United States Patent
Somayaji et al.

(10) Patent No.: US 9,542,521 B2
(45) Date of Patent: Jan. 10, 2017

(54) FILLER INSERTION IN CIRCUIT LAYOUT

(71) Applicant: Texas Instruments Incorporated, Dallas, TX (US)

(72) Inventors: Ananth Somayaji, Bangalore (IN); Sourav Modi, Bangalore (IN); Sani Dewal, Bangalore (IN); Saravanan Ambikapathy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 140 days.

(21) Appl. No.: 14/496,774

(22) Filed: Sep. 25, 2014

(65) Prior Publication Data

US 2016/0092624 A1    Mar. 31, 2016

(51) Int. Cl.
*G06F 17/50* (2006.01)
(52) U.S. Cl.
CPC ....... *G06F 17/5072* (2013.01); *G06F 2217/78* (2013.01)
(58) Field of Classification Search
CPC .............. G03F 1/144; G03F 1/36; G03F 1/30; G03F 7/70441; G03F 1/70; G06F 17/5081; G06F 2217/12; G06F 17/5068; G06F 17/5072; H01L 21/32139
USPC .................................. 716/50–55; 430/5, 30
See application file for complete search history.

(56) References Cited

U.S. PATENT DOCUMENTS

| | | | |
|---|---|---|---|
| 7,895,548 B2 * | 2/2011 | Lin ..................... | G06F 17/5068 716/122 |
| 2002/0155357 A1* | 10/2002 | LaCour .............. | G03F 7/70441 430/5 |
| 2009/0267124 A1* | 10/2009 | Bosshard ............ | G06F 17/5072 257/296 |
| 2011/0095374 A1* | 4/2011 | Kawahara .......... | G06F 17/5068 257/368 |

* cited by examiner

*Primary Examiner* — Nghia Doan
(74) *Attorney, Agent, or Firm* — John R. Pessetto; Charles A. Brill; Frank D. Cimino

(57) ABSTRACT

A method for filler insertions in a circuit layout having a cell row of standard cells and gaps between the standard cells is disclosed. First, a set of filler classes, each filler class having a set of filler cells, is classified that are configured to fill the gaps depending on a design requirement. Then, a filler insertion pattern based on a required ratio is identified such that horizontal and vertical density of the set of filler classes in the circuit layout are as per the required ratio and the cell row of the circuit layout has at least one filler cell from each of the set of filler classes.

10 Claims, 4 Drawing Sheets

FILLER INSERTION IN CIRCUIT LAYOUT

TECHNICAL FIELD

Embodiments of the disclosure relate to filler insertion in circuit layout for improving circuit performance.

BACKGROUND

The current physical design methodologies adopt filling the gaps in a circuit layout between the cell rows of standard cells with a single type of fillers. This leads to certain difficulties like engineering change order (ECO) capability and are not very efficient with power supply robustness. The ECO is not possible with single type of fillers because the base layers are also required to be changed. In a metal ECO change the base layers is not ideal.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An embodiment provides a method for filler insertions in a circuit layout having a cell row of standard cells and gaps between the standard cells. First, a set of filler classes, each filler class having a set of filler cells, is classified that are configured to fill the gaps depending on a design requirement. Then, a filler insertion pattern based on a required ratio is identified such that horizontal and vertical density of the set of filler classes in the circuit layout are as per the required ratio and the cell row of the circuit layout has at least one filler cell from each of the set of filler classes.

An embodiment provides a semiconductor device having a circuit layout. The circuit layout includes a cell row of standard cells and gaps between the standard cells; and a set of filler classes that is intended to be inserted to fill the gaps depending on a design requirement and a required ratio of the set of filler classes. A filler insertion pattern is configured per the required ratio such that horizontal and vertical density of the set of filler classes are the same and the cell row of the circuit layout has one or more types of filler classes of the set of filler classes.

Another embodiment provides a non-transitory computer readable medium, for use by a computer system, provided with a layout of a circuit for filler insertions in a circuit layout having a cell row of standard cells and gaps between the standard cells. The circuit layout includes a cell row of standard cells and gaps between the standard cells; and a set of filler classes that is intended to be inserted to fill the gaps depending on a design requirement and a required ratio of the set of filler classes. A filler insertion pattern is configured as per the required ratio such that horizontal and vertical density of the set of filler classes are the same and the cell row of the circuit layout has one or more types of filler classes of the set of filler classes.

Other aspects and example embodiments are provided in the Drawings and the Detailed Description that follows.

BRIEF DESCRIPTION OF THE VIEWS OF DRAWINGS

FIG. 2b illustrates the gaps for fillers in FIG. 1 filled using the filler pattern of FIG. 2a;

DETAILED DESCRIPTION OF THE EMBODIMENTS

Figure 1:
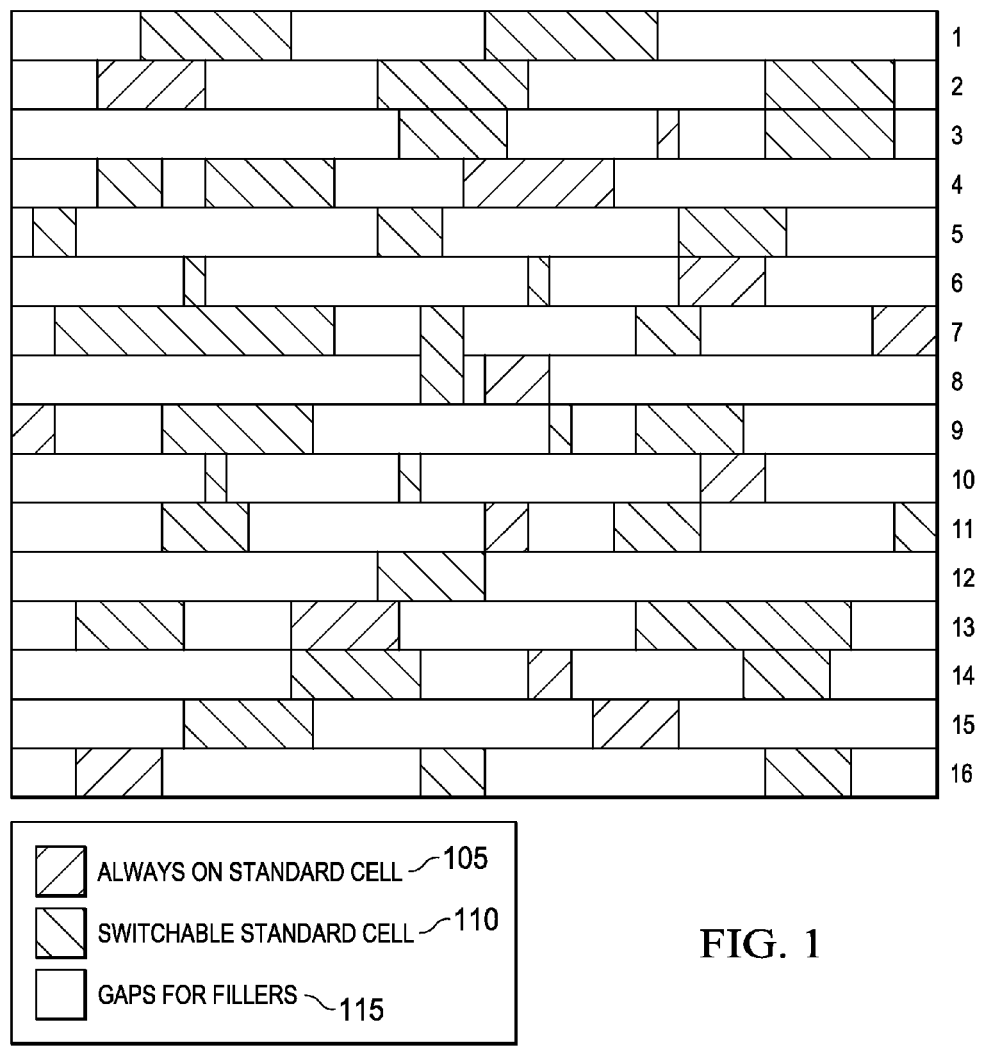
FIG. 1 illustrates placement of standard cells in a circuit layout by a place and route tool.

FIG. 1 illustrates placement of standard cells in a circuit layout by a place and route tool. In a standard cell layout of a low power design, gaps are created between standard cells. This is because it is not possible to have 100% utilization of the layout and also due to routing congestion. These gaps needs to be filled for N-well continuity and to eliminate the issues related to yield of the semiconductor chip.

In low power design there are two kinds of standard cells based on power domain type. First is switchable standard cell and the second is always-on standard cell. Referring to FIG. 1, there are 16 rows of standard cells illustrated. Each standard cell row may have switchable standard cells 110, always-on standard cells 105 and gaps for fillers (gaps created between standard cells) 115.

The switchable standard cells 110 are powered off when the entire power domain turns off. The switchable standard cells 110 are powered by a local power supply. The always-on standard cells 105 always remain in the power on state and do not switch off when the power domain is turned off. Switchable standard cells 110 operate on a locally supplied Vdd and always-on standard cells 105 operate on a global Vdd. Power rail for Switchable standard cells 110 and always-on standard cells 105 is different and this limitation forces the design to have two kinds of decaps (decoupling capacitors), one to supply charge to switchable standard cells 110 and other to supply charge to always-on standard cells 105.

The gaps for fillers 115 are generally filled by three filler classes namely, standard cell fillers 205, decaps 210 and always-on decaps 215. It is noted that all kinds of decaps are treated as fillers and set of them forms a set of filler class. Standard cell fillers 205 are used if there is a requirement for an ECO. For example, if there needs to be functional change, standard cell fillers 205 needs to be inserted at a later point of time in the design cycle. Decaps 210 are used to supply charge to switchable standard cells. Always-on decaps 210 are used to supply charge to always-on standard cells.

The gaps for fillers are inserted with set of filler classes using a filler insertion pattern. An example of a conventional filler pattern is illustrated in FIG. 2. It can be seen form FIG. 2 that a single standard cell row has only one filler class. For example, FIG. 2 has 5 standard cell rows and the first two is decap 210, third is always-on decap 215 and fourth and fifth are standard cell fillers 205.

Figure 2A:
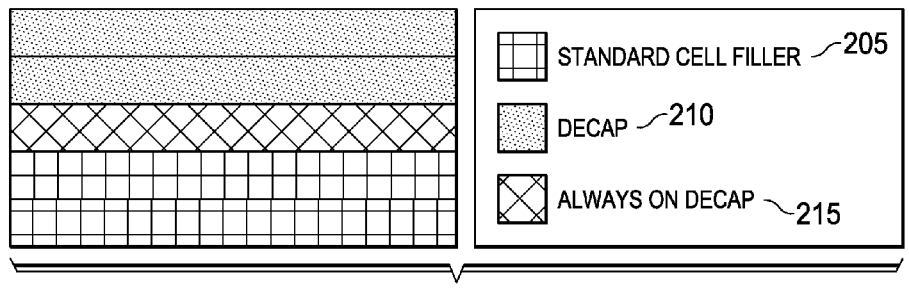
FIG. 2a illustrates a filler pattern in a standard place and route tool.
Figure 2B:
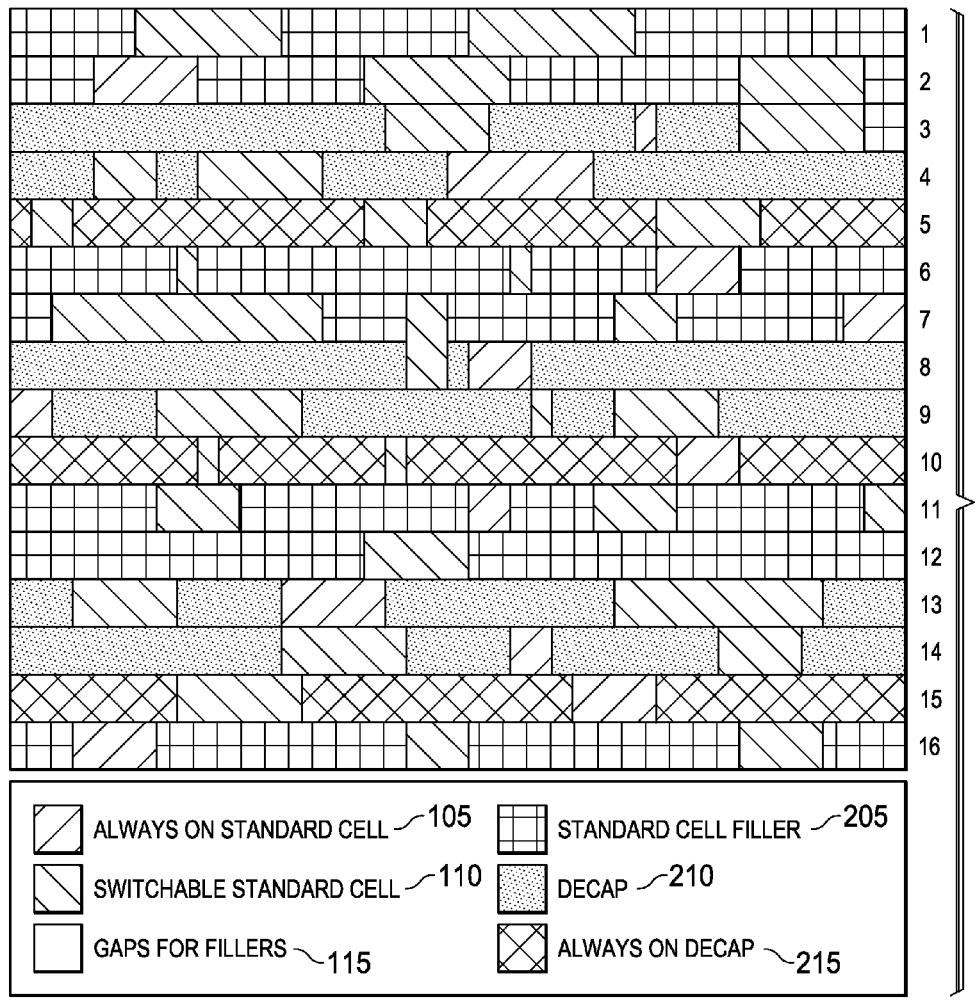

FIG. 2b illustrates the gaps for fillers in FIG. 1 filled using the filler pattern of FIG. 2a. It can be seen that each row has only one filler class of the set of filler classes. For example, standard cell fillers 205 are only in rows 1, 2, 6, 7, 11, 12 and 16. Always-on decaps 215 are only in rows 5, 10 and 15. Normal decap 210 is only in rows 4, 8, 9, 13 and 14.

Certain disadvantages with the layout in FIG. 2b are explained now. On rows with decaps 210, it is impossible to do any functional ECOs (metal ECOs). The always-on standard cells 105 will not have a low resistance path to the always-on decaps 215. On rows with standard cell fillers, the IR robustness is poor as the logic standard cells will not have low resistance path to the decaps 210 and always-on decaps 215. This is because both decaps 210 and always-on decaps 215 are not available in the same row. On rows with always-on decaps 215, it is impossible to do any functional ECOs (metal ECOs). Additionally, the switched standard cells will not have a low resistance path to decaps.

Figure 3:
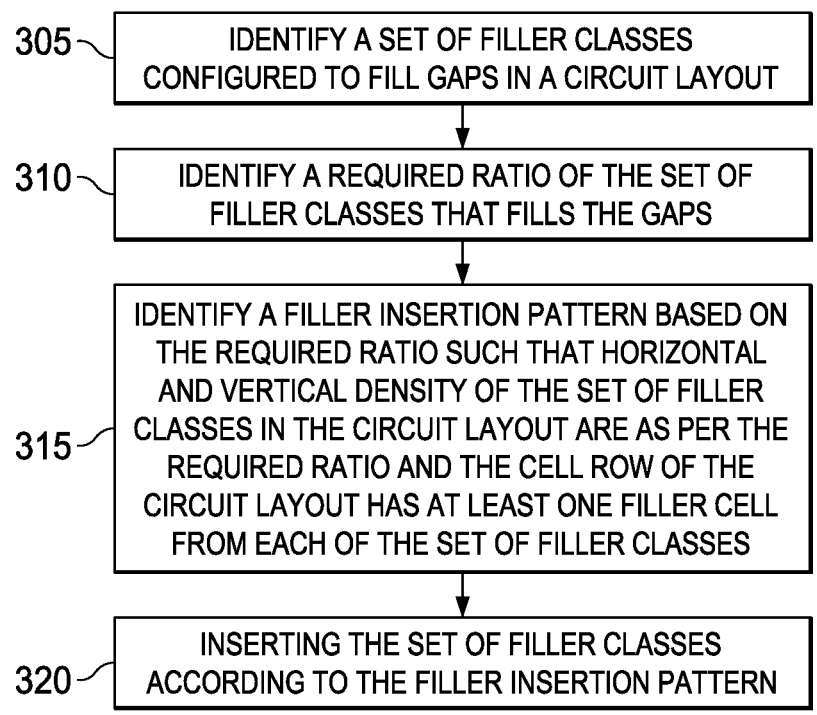
FIG. 3 is a flow diagram illustrating an embodiment.
Figure 4A:
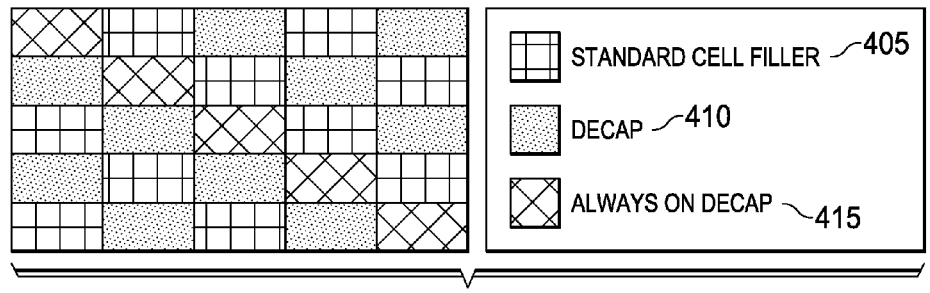
FIG. 4a illustrates a filler pattern according to an embodiment.
Figure 4B:
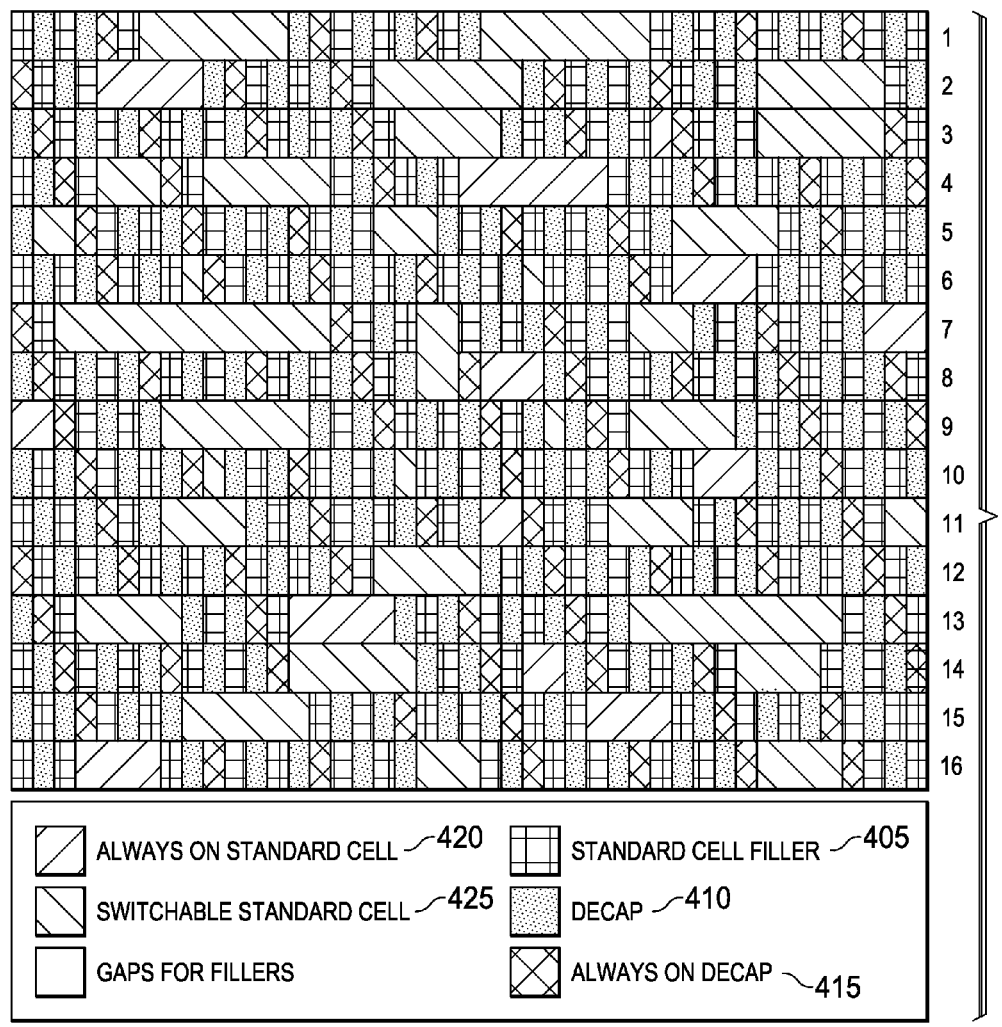
FIG. 4b illustrates the gaps for fillers in FIG. 1 filled using the filler pattern of FIG. 4a according to an embodiment.

To overcome the above disadvantages, according to an embodiment, a design methodology is illustrated in FIGS. 3, 4a and 4b. Referring now to FIG. 3, at step 305, a set of filler classes are classified, that are configured to fill the gaps depending on a design requirement. Each filler class includes standard cell fillers 405, decaps 410 and always-on decaps 415. Each filler class has a set of filler cells. At step 310, a required ratio of the set of filler classes is identified that fills the gaps in the circuit layout. The required ratio is dependend on a design requirement and is configurable. For example, 20% for always-on decaps, 40% for standard cell filler and 40% for decaps. For above percentage configuration there can be many filler insertion patterns.

At step 315, a filler insertion pattern based on the required ratio is identified such that horizontal and vertical density of the set of filler classes in the circuit layout are as per the required ratio and the cell row of the circuit layout has at least one filler cell from each of the set of filler classes. A filler insertion according to an embodiment is illustrated in FIG. 4a. It is noted that each row of FIG. 4A has 5 partitions and the design requirement is 20% for always-on decaps 415, 40% for standard cell filler 405 and 40% for decaps 410. Horizontal density and vertical density requirement are explained now. Horizontal density of always-on decaps is 20% as per the design requirement, and this means that any row and any partition of the standard cells needs to have one always-on decap in 5 partitions. It is also noted that the partitions can be either horizontal or vertical. It can be seen from FIGS. 4A and 4B that any partition either horizontal or vertical has only one block filled with always-on decap. The case is similar for standard cell filler and decap.

At step 320, the set of filler classes according to the filler insertion pattern are inserted in the circuit layout.

Embodiments of the disclosure can be implemented in a non-transitory computer readable medium, for use by a computer system, provided with a layout of a circuit for filler insertions in a circuit layout having a cell row of standard cells and gaps between the standard cells using steps 305-320.

FIG. 4b illustrates the gaps for fillers in FIG. 1 filled using the filler pattern of FIG. 4a according to an embodiment. The filler pattern of FIG. 4a includes standard cell filler 405, decap 410, and always on decap 415 as explained earlier. It is noted that each row in FIG. 4B has all the filler classes per the required ratio and per the filler insertion pattern. For example, any 5×5 partition of the standard cell will be the replica of the filler insertion pattern in FIG. 4a.

According to various embodiments, each standard cell row guarantees standard cell fillers for metal ECOs and decaps for ensuring IR Robustness of switchable standard cells and always-on decap for IR robustness of always-on standard cell. This also ensures proper decap density in both horizontal and vertical directions in the design. The methodology can be easily customized for every class of design and can be extended to more classes of fillers.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A method for filler insertions in a circuit layout having a cell row of standard cells and gaps between the standard cells, comprising:
    classifying a set of filler classes including a decap, a standard cell filler and an always-on decap, each filler class having a set of filler cells, that are configured to fill the gaps depending on a design requirement;
    identifying a required ratio of the set of filler classes that fills the gaps in the circuit layout; and
    identifying a filler insertion pattern based on the required ratio such that horizontal and vertical density of the set of filler classes in the circuit layout are as per the required ratio and the cell row of the circuit layout has at least one filler cell from each of the set of filler classes;
    wherein the set of filler classes and the standard cells are fabricated on a semiconductor substrate; and
    wherein identifying a required ratio of the set of filler classes comprises identifying the required ratio that is configurable as per the design requirement.

2. The method of claim 1 and further comprising inserting the set of filler classes according to the filler insertion pattern in the circuit layout.

3. The method of claim 1, wherein identifying a filler insertion pattern based on the required ratio comprises identifying a filler insertion pattern such that the cell row has at least one filler cell from each of the set of filler classes.

4. The method of claim 3, wherein the filler insertion pattern is identified such that an engineering change order is accommodated for the cell row and an IR robustness for the circuit layout is improved.

5. A semiconductor device having a circuit layout, the circuit layout comprising:
    a plurality of cell rows of standard cells and gaps between the standard cells; and
    a set of filler classes in the gaps, wherein a horizontal and a vertical density of the set of filler classes are the same in the circuit layout and each of the cell rows has one or more types of filler classes of the set of filler classes;
    a required ratio of the set of filler classes that fills the gaps in the circuit layout;
    wherein the set of filler classes and the standard cells are fabricated on a semiconductor substrate; and
    wherein the required ratio of the set of filler classes is configurable.

6. The circuit layout of claim 5, wherein the set of filler classes comprises at least one of a decap, a standard cell filler and an always-on decap.

7. The circuit layout of claim 5, wherein the set of filler classes in the gaps is such that each of the cell rows has at least one standard cell and at least one decap.

8. A non-transitory computer readable medium, for use by a computer system, provided with a layout of a circuit for filler insertions in a circuit layout having a plurality of cell rows of standard cells and gaps between the standard cells, comprising:
    a set of filler classes in the gaps, wherein a horizontal and a vertical density of the set of filler classes are the same in the circuit layout and each of the cell rows has one or more types of filler classes of the set of filler classes: a required ratio of the set of filler classes that fills the gaps in the circuit layout;

wherein the set of filler classes and the standard cells are fabricated on a semiconductor substrate; and wherein the required ratio of the set of filler classes is configurable.

9. The non-transitory computer readable medium of claim 8, wherein the set of filler classes comprises at least one of a decap, a standard cell filler and an always-on decap.

10. The non-transitory computer readable medium of claim 8, wherein the set of filler classes in the gaps is such that each of the cell rows has at least one standard cell and at least one decap.

\* \* \* \* \*